(12) United States Patent
Chen et al.

(10) Patent No.: US 11,811,075 B2
(45) Date of Patent: Nov. 7, 2023

(54) SECONDARY BATTERY

(71) Applicant: CONTEMPORARY AMPEREX TECHNOLOGY CO., LIMITED, Ningde (CN)

(72) Inventors: Lei Chen, Ningde (CN); Shoujiang Xu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 208 days.

(21) Appl. No.: 17/354,875

(22) Filed: Jun. 22, 2021

(65) Prior Publication Data

US 2021/0320388 A1 Oct. 14, 2021

Related U.S. Application Data

(63) Continuation of application No. PCT/CN2020/072264, filed on Jan. 15, 2020.

(30) Foreign Application Priority Data

Jan. 31, 2019 (CN) .......................... 201920172921.4

(51) Int. Cl.
*H01M 50/103* (2021.01)
*H01M 50/586* (2021.01)

(52) U.S. Cl.
CPC ........ *H01M 50/103* (2021.01); *H01M 50/586* (2021.01)

(58) Field of Classification Search
None
See application file for complete search history.

(56) References Cited

U.S. PATENT DOCUMENTS

2015/0340663 A1* 11/2015 Minagata ............. H01M 50/119
429/163
2019/0207173 A1* 7/2019 Li ..................... H01M 10/0587

FOREIGN PATENT DOCUMENTS

| CN | 2914349 Y | 6/2007 |
| CN | 102214813 A | 10/2011 |

(Continued)

OTHER PUBLICATIONS

The World Intellectual Property Organization (WIPO) International Search Report and Written opinion for PCT/CN2020/072264 Apr. 22, 2020 17 pages (including English translation).

(Continued)

*Primary Examiner* — Wyatt P McConnell
(74) *Attorney, Agent, or Firm* — Anova Law Group, PLLC

(57) ABSTRACT

The present invention provides a secondary battery, including an electrode assembly, a housing, a top cover assembly, and an insulating member. The electrode assembly includes two first surfaces and two second surfaces, and the two first surfaces are located respectively at two ends of the electrode assembly in the thickness direction. The second surfaces are extended from the ends of the first surfaces along a width direction, and intersecting lines are formed between the first surfaces and the second surfaces. The housing has an opening and forms an accommodating cavity. The electrode assembly is located inside the accommodating cavity of the housing, and the top cover assembly is connected to the opening of the housing and seals the housing. The insulating member includes two first insulating sheets, and the two first insulating sheets are disposed respectively at two sides of the electrode assembly along the thickness direction.

14 Claims, 9 Drawing Sheets

(56) References Cited

FOREIGN PATENT DOCUMENTS

| | | |
|---|---|---|
| CN | 106992320 A | 7/2017 |
| CN | 107534105 A | 1/2018 |
| CN | 108428845 A | 8/2018 |
| CN | 209401731 U | 9/2019 |
| EP | 2866279 A1 | 4/2015 |
| JP | 2017111966 A | 6/2017 |

OTHER PUBLICATIONS

The European Patent Office (EPO) The intention to grant for EP Application No. 20748389.2, Nov. 11, 2022, 5 Pages.
The European Patent Office (EPO) Extended Search Report for EP Application No. 20748389.2, Mar. 14, 2022, 8 Pages.

* cited by examiner

SECONDARY BATTERY

CROSS-REFERENCE TO RELATED APPLICATIONS

This application is a continuation application of PCT Patent Application No. PCT/CN2020/072264, entitled "SECONDARY CELL" filed on Jan. 15, 2020, which claims priority to Chinese Patent Application No. 201920172921.4, filed with the China National Intellectual Property Administration on Jan. 31, 2019 and entitled "SECONDARY BATTERY", all of which are incorporated herein by reference in their entirety.

TECHNICAL FIELD

This application relates to the battery field, and in particular, to a secondary battery.

BACKGROUND

A secondary battery includes an electrode assembly and a housing for accommodating the electrode assembly. In a process of assembling the secondary battery, metallic foreign matters may be remained inside the housing. When the electrode assembly expands, the metallic foreign matters easily pierce a separator of the electrode assembly and stab an electrode plate of the electrode assembly, leading to a risk of short circuit.

SUMMARY

In view of the existing problems in Background, an objective of the present invention is to provide a secondary battery, which may reduce a risk of short circuit, and improve safety performance.

In order to achieve the foregoing objective, the present invention provides a secondary battery, including an electrode assembly, a housing, a top cover assembly, and an insulating member. The electrode assembly includes two first surfaces and two second surfaces. The two first surfaces are located respectively at two ends of the electrode assembly along a thickness direction of the secondary battery. The second surfaces are extended from the ends of the first surfaces along a width direction of the secondary battery, and intersecting lines are formed between the first surfaces and the second surfaces. The housing has an opening and forms an accommodating cavity. The electrode assembly is located inside the accommodating cavity of the housing, and the top cover assembly is connected to the housing. The insulating member includes two first insulating sheets, and the two first insulating sheets are disposed respectively at two sides of the electrode assembly along the thickness direction. The first insulating sheet includes a first part. Along the width direction, an edge of the first part does not go beyond the intersecting line.

In the secondary battery according to some embodiments, the first insulating sheet further includes a second part. The second part is disposed at a side of the first part close to the top cover assembly. Along the width direction, an edge of the second part goes beyond the edge of the first part.

In the secondary battery according to some embodiments, along the width direction, the edge of the second part goes beyond the intersecting line.

In the secondary battery according to some embodiments, the housing includes first side walls and second side walls. The first side walls are disposed opposite to the first surfaces, and the second side walls are disposed opposite to the second surfaces. In the width direction, at least a partial region of the second surface is closer to the second side wall than the second part.

In the secondary battery according to some embodiments, the first insulating sheet further includes a third part disposed between the first part and the second part. Along a direction close to the first part, the third part is progressively reduced in dimension along the width direction.

In the secondary battery according to some embodiments, along a height direction of the secondary battery, the ratio of a dimension of the first part to a dimension of the first insulating sheet is 0.2 to 0.8.

In the secondary battery according to some embodiments, the secondary battery further includes an adhesive tape, and the adhesive tape is disposed at the outsides of the first part and the electrode assembly, and attached to the first part and the second surfaces.

In the secondary battery according to some embodiments, along the height direction, the ratio of a dimension of the adhesive tape to the dimension of the first part is 0.2 to 0.9.

In the secondary battery according to some embodiments, the electrode assembly includes a plurality of electrode units arranged along the thickness direction, and each of the electrode units is a winding structure in a flat shape. An end of each of the electrode units has an arc surface along the width direction, and the second surface includes the arc surfaces of the plurality of electrode units.

In the secondary battery according to some embodiments, the top cover assembly includes a top cover plate, and the top cover plate is connected to the housing. The insulating member further includes a second insulating sheet. The second insulating sheet is fastened to a side of the top cover plate close to the electrode assembly. The second insulating sheet is connected to the first insulating sheet.

In the secondary battery according to some embodiments, the top cover assembly further includes electrode terminals and a connection strap. The electrode terminals are disposed on the top cover plate, and the connection strap is connected to the electrode terminals and the electrode assembly. At least a part of the second insulating sheet is sandwiched between the connection strap and the top cover plate.

In the secondary battery according to some embodiments, the second insulating sheet has through holes, and the electrode terminals pass through the through holes.

In the secondary battery according to some embodiments, the two first insulating sheets and the second insulating sheet form a U-shape structure and are integrally formed.

In the secondary battery according to some embodiments, the first surfaces are planes.

Beneficial effects of the present invention are as follows: the first insulating sheet in this application may protect the electrode assembly to prevent metallic foreign matters from piercing the electrode assembly, reducing the risk of short circuit and improving the safety performance. In addition, the first part of the first insulating sheet is attached to the first surface, reducing the damage of the first insulating sheet to some extent during assembly of the electrode assembly and the housing, and improving the safety performance of the secondary battery.

Description of reference signs:

1. electrode assembly
   11. first surface
   12. second surface
   13. electrode unit
      131. arc surface
      132. main surface
2. housing
   21. first side wall
   22. second side wall
3. top cover assembly
   31. top cover plate
   32. electrode terminal
   33. connection strap
4. insulating member
   41. first insulating sheet
      411. first part
      412. second part
      413. third part
   42. second insulating sheet
      421. through hole
5. adhesive tape
X. width direction
Y. thickness direction
Z. height direction

DESCRIPTION OF EMBODIMENTS

To make the objectives, technical solutions, and advantages of this application more comprehensible, the following describes this application in detail with reference to embodiments and accompanying drawings. It should be understood that the specific embodiments described herein are merely used to explain this application but are not intended to limit this application.

In the descriptions of this application, unless otherwise specified and defined explicitly, the terms "first", "second", and "third" are merely intended for a purpose of description, and should not be understood as any indication or implication of relative importance; the term "plurality" indicates two or more (including two); and unless otherwise specified and defined explicitly, the term "connection" should be understood in its general sense. For example, the "connection" may be a fixed connection, a detachable connection, an integrated connection, an electrical connection, or a signal connection; and may be a direct connection, or an indirect connection through an intermediate medium. A person of ordinary skill in the art can understand specific meanings of these terms in this application based on specific situations.

In the descriptions of the specification, it should be understood that the directional terms such as "up" and "down" described in the embodiments of this application are described from angles shown in the accompanying drawings, and should not be understood as a limitation on the embodiments of this application. This application is further described in detail with reference to specific embodiments and accompanying drawings.

Figure 1:
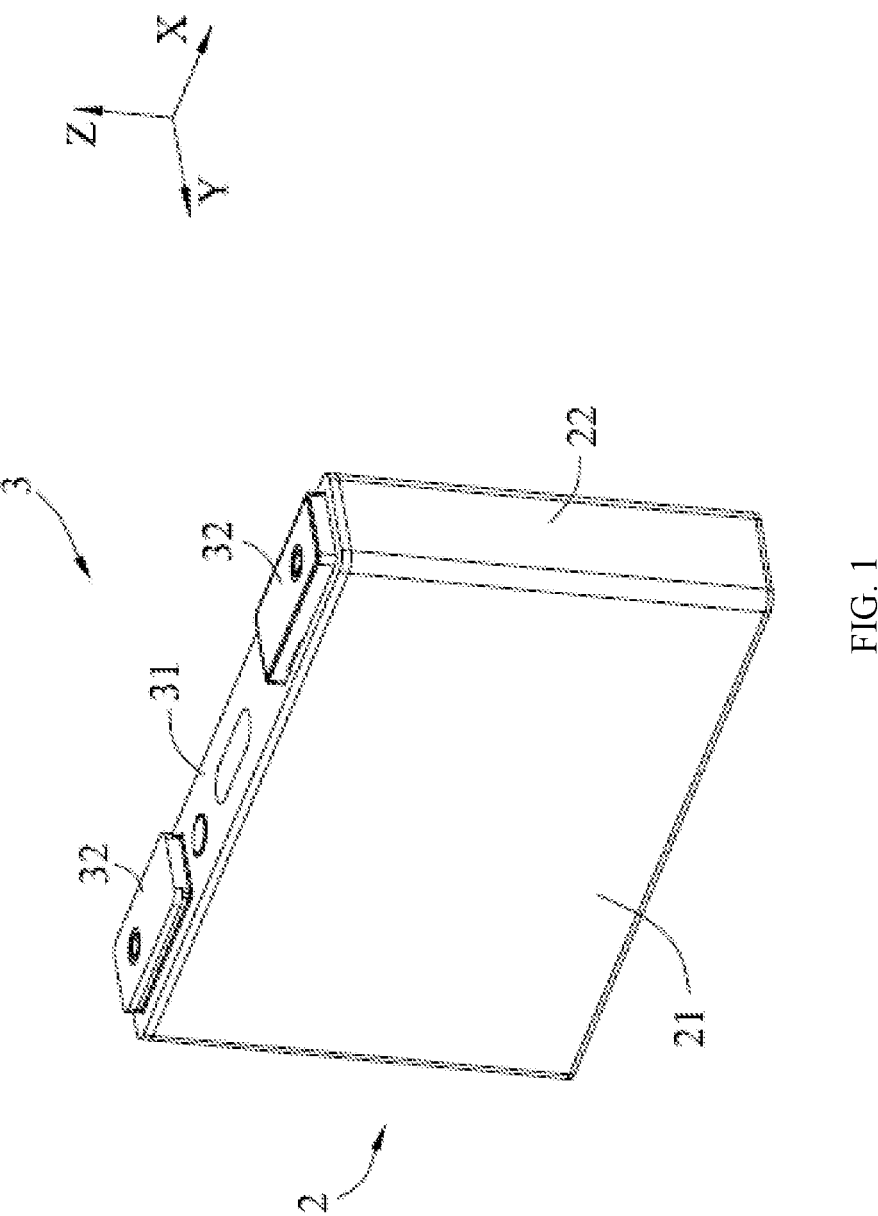
FIG. 1 is a schematic diagram of a secondary battery according to the present invention.
Figure 2:
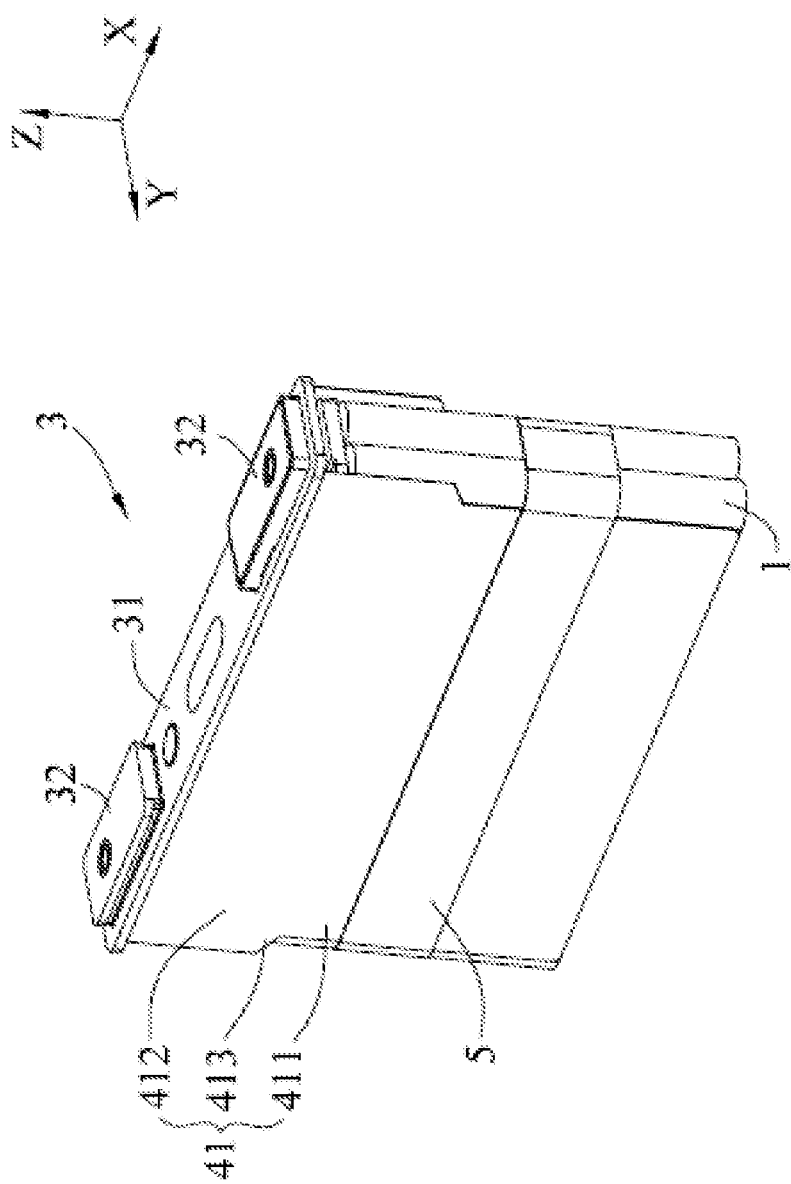
FIG. 2 is another schematic diagram of a secondary battery according to the present invention, where a housing is omitted.

Referring to FIG. 1 and FIG. 2, in an embodiment, a secondary battery according to this application includes an electrode assembly 1, a housing 2, a top cover assembly 3, and an insulating member 4.

There is an accommodating cavity formed inside the housing 2 for accommodating the electrode assembly 1 and an electrolyte. An opening is formed at one end of the housing 2, and the electrode assembly 1 may be placed into the housing 2 through the opening. The housing 2 may be made of a conductive metal material such as aluminum or aluminum alloy. The housing 2 may be in a prismatic form. Specifically, the housing 2 includes first side walls 21, second side walls 22 and a bottom wall. The first side walls 21 are two walls and disposed respectively at two sides of the electrode assembly 1 along a thickness direction Y. The second side walls 22 are two walls and disposed respectively at two sides of the electrode assembly 1 along a width direction X. The two first side walls 21 and the two second side walls 22 are connected together to form a frame with an approximately rectangular shape. The bottom wall is disposed under the first side walls 21 and the second side walls 22, and connected to the first side walls 21 and the second side walls 22. The bottom side wall, the two first side walls 21, and the two second side walls 22 are enclosed to form an accommodating cavity of the housing 2.

Figure 4:
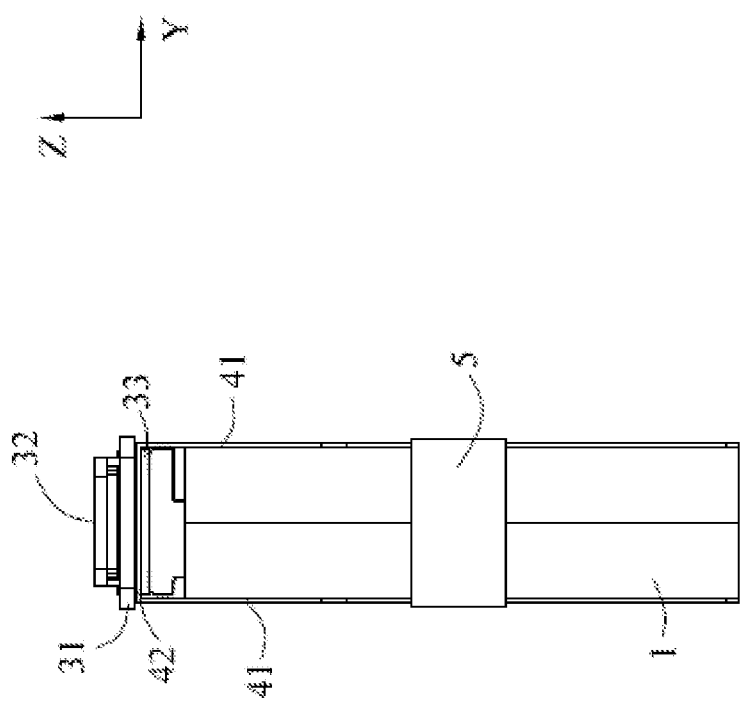
FIG. 4 is a side view of the secondary battery of FIG. 2.
Figure 5:
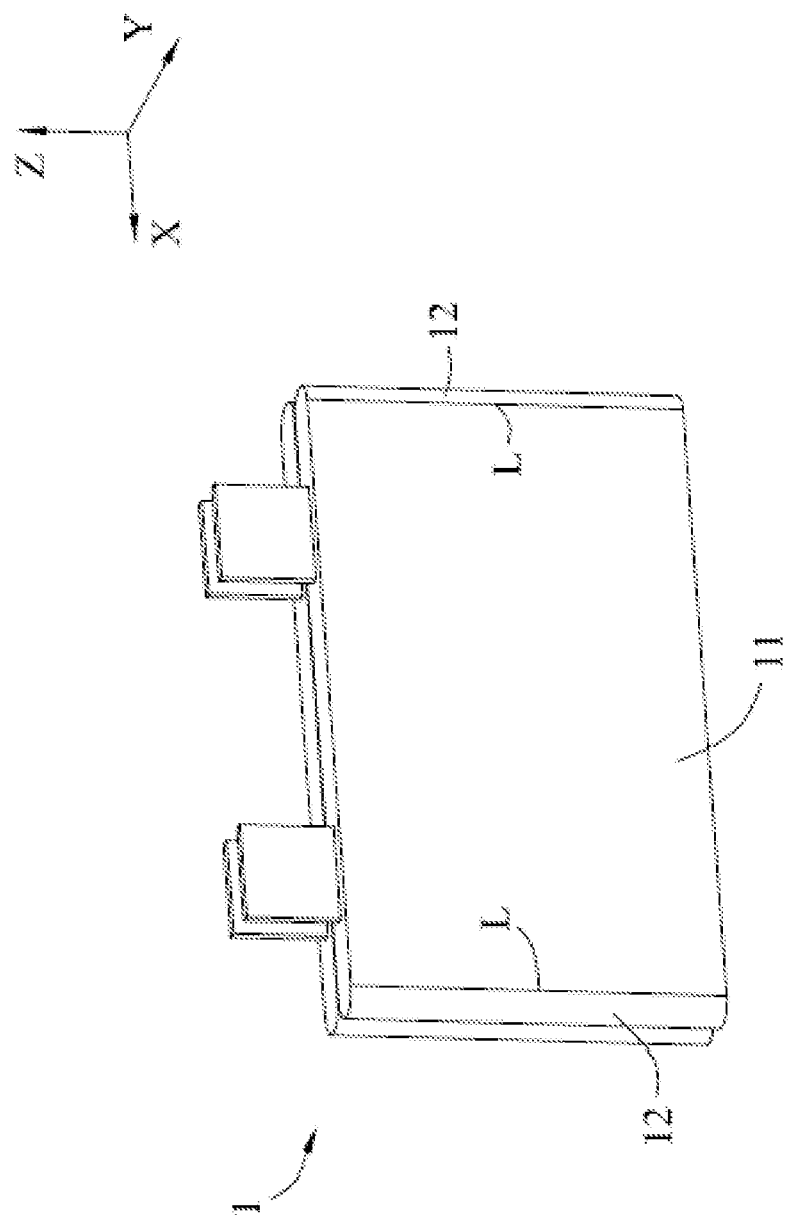
FIG. 5 is a schematic diagram of an electrode assembly of a secondary battery according to the present invention.
Figure 6:
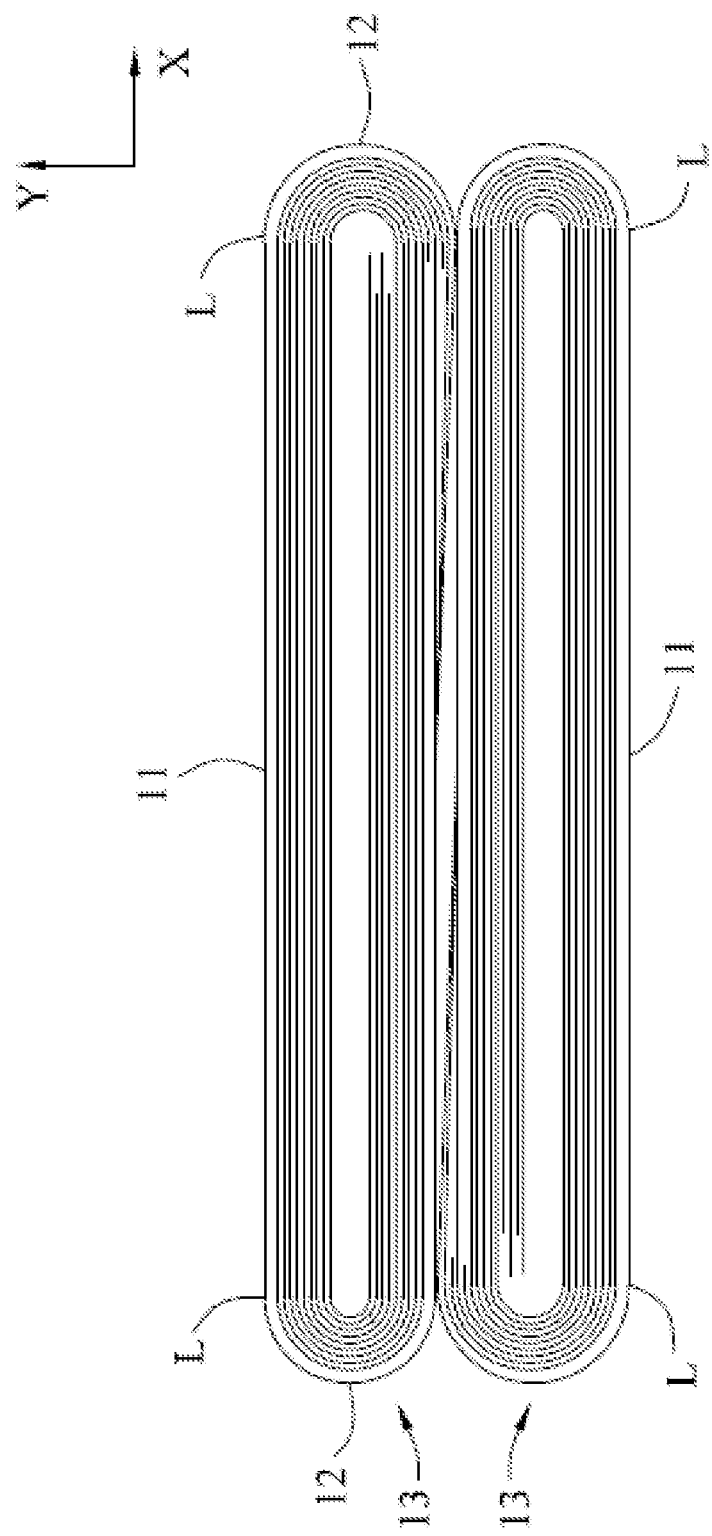
FIG. 6 is a cross-sectional view of the secondary battery of FIG. 5.

Referring to FIG. 4, a top cover assembly 3 includes a top cover plate 31, electrode terminals 32, and a connection strap 33. The top cover plate 31 is connected to the housing 2 and covers the opening of the housing 2 to seal the opening of the housing 2. The electrode terminals 32 are disposed on the top cover plate 31, and the connection strap 33 is connected to the electrode terminals 32 and the electrode assembly 1. In a height direction Z, bottom walls of the top cover plate 31 and the housing 2 are located respectively at two sides of the electrode assembly 1.

Figure 7:
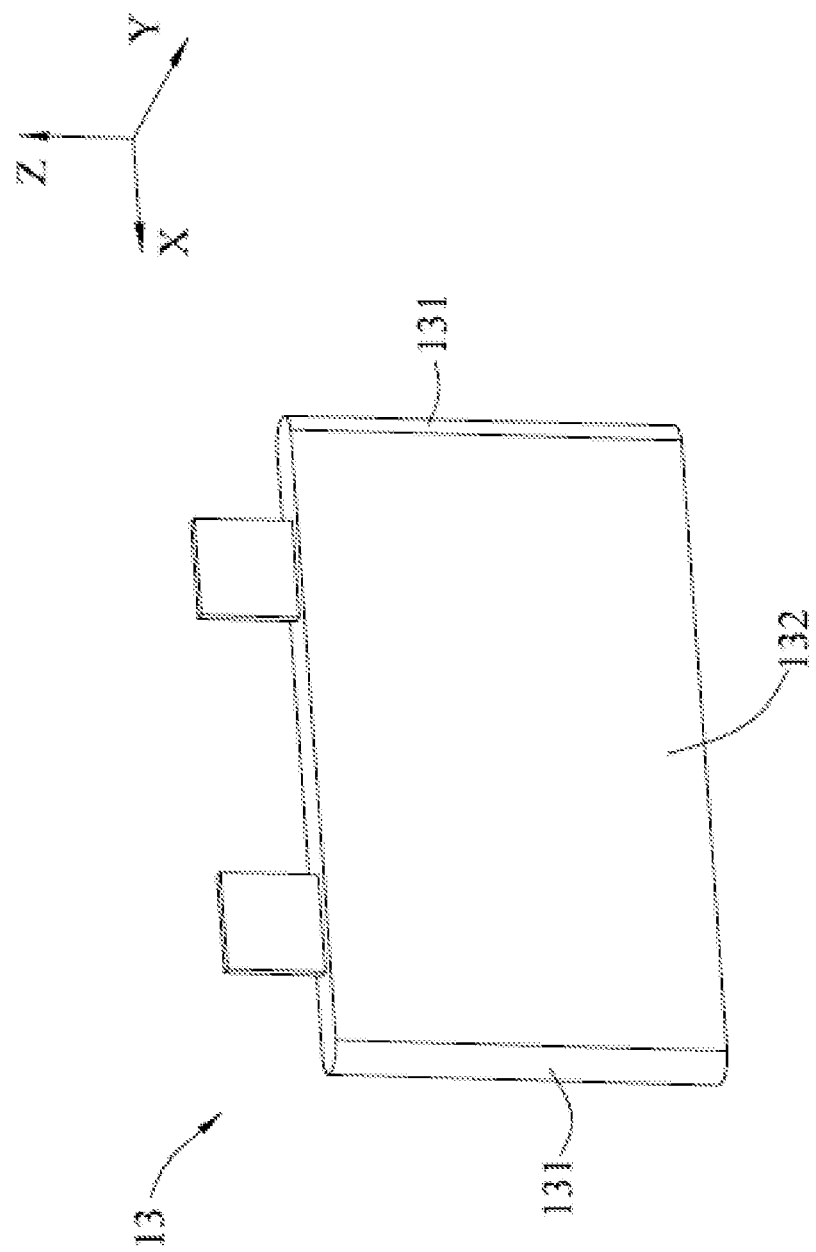
FIG. 7 is a schematic diagram of an electrode unit of an electrode assembly according to the present invention.

The electrode assembly 1 is a core component of the secondary battery to implement charging and discharging functions. The electrode assembly 1 may include one or more electrode units 13. Each electrode unit 13 includes a positive electrode plate, a negative electrode plate, and a separator. The separator separates the positive electrode plate from the negative electrode plate. The electrode unit 13 may be formed by spirally winding the positive electrode plate, the negative electrode plate, and the separator, and the electrode unit 13 forms a flat structure by pressing. Referring to FIG. 7, a surface of the electrode unit 13 includes an arc surface 131 and a main surface 132. The main surface 132 is located at two sides of the electrode unit 13 along a thickness direction Y, and the main surface 132 is generally a plane. The arc surfaces 131 are located at two sides of the electrode unit 13 along a width direction X, and the arc surfaces 131 are connected to the two main surfaces 132. In addition, at least a portion of the arc surfaces 131 is curved.

To improve the capacity of the secondary battery, the electrode assembly 1 in this application preferably includes a plurality of electrode units 13, and the plurality of electrode units 13 are laminated along the thickness direction Y. The main surfaces 132 of two adjacent electrode units 13 come in contact with each other.

The electrode assembly 1 includes two first surfaces 11 and two second surfaces 12, and the two first surfaces 11 are located respectively at two ends of the electrode assembly 1 along the thickness direction Y. Each of the second surfaces 12 is extended from the ends of the first surface 11 along the width direction X. The two second surfaces 12 are located respectively at two ends of the electrode assembly 1 along the width direction X, and two ends of each of the second surfaces 12 are respectively connected to the two first surfaces 11.

In this embodiment, the plurality of electrode units 13 of the electrode assembly 1 are laminated, therefore, among all main surfaces 132 of the plurality of electrode units 13, one main surface 132 closest to the first side wall 21 is exposed, and the other main surface 132 closest to the other first side wall 21 is exposed. The exposed two main surfaces 132 are respectively the two first surfaces 11 of the electrode assembly 1. In addition, the "exposed" is described relative to the electrode assembly 1.

A gap is kept between the arc surfaces 131 of adjacent electrode units 13, therefore, the arc surface 131 of each electrode unit 13 is not covered by other electrode units 13, and the arc surfaces 131 of the plurality of electrode units 13 are exposed. One second surface 12 includes arc surfaces 131 of the plurality of electrode units 13 at one end along the width direction X, and the other second surface 12 includes arc surfaces 131 of the plurality of electrode units 13 at the other end along the width direction X.

In this application, the two first surfaces 11 are located respectively at two ends of the electrode assembly 1 along the thickness direction Y, while the two second surfaces 12 are located respectively at two ends of the electrode assembly 1 along the width direction X. The first surfaces 11 and the second surfaces 12 are intersected with each other, therefore, intersecting lines L are formed at boundaries between the first surfaces 11 and the second surfaces 12.

To improve the energy density, a gap reserved between the electrode assembly 1 and the housing 2 is small, especially the gap between the first surface 11 and the first side wall 21. The electrode assembly 1 may expand during operation, and the expanded electrode assembly 1 may press against the housing 2. In a process of assembling the secondary battery, metallic foreign matters may be remained inside the housing 2. The metallic foreign matters easily pierce the electrode assembly 1, leading to a risk of short circuit.

In this application, preferably an insulating member 4 is disposed inside the housing 2. The insulating member 4 includes two first insulating sheets 41, and the two first insulating sheets 41 are located respectively at two sides of the electrode assembly 1 along the thickness direction Y. Preferably, the two first insulating sheets 41 are respectively attached and fastened to the two first surfaces 11. The first insulating sheet 41 may protect the electrode assembly 1 to prevent metallic foreign matters from piercing the electrode assembly 1, reducing the risk of short circuit, and improving the safety performance.

The first insulating sheet 41 may be fastened onto the electrode assembly 1 by wrapping an adhesive tape 5 at the outside. If the first insulating sheet 41 goes beyond the intersecting line L on the whole, a portion of the first insulating sheet 41 beyond the intersecting line L is unable to be closely attached to the second surface 12. Because the first insulating sheet 41 has a certain rigidity, the first insulating sheet 41 is prone to warp under the action of the adhesive tape 5, affecting the placement of the electrode assembly 1 into the housing, and reducing connection strength between the first insulating sheet 41 and the electrode assembly 1.

Preferably, the first insulating sheet 41 includes a first part 411. An edge E2 of the first part 411 does not go beyond the intersecting line L along the width direction X. In the width direction X, a dimension of the first part 411 is less than or equal to a dimension of the first surface 11. It is added here that, based on the center of the first part 411 along the width direction X, in the width direction X, the edge E2 of the first part 411 along a forward direction does not go beyond the intersecting line L at an end of the first surface 11 along a forward direction, and the edge E2 of the first part 411 along a reverse direction does not go beyond the intersecting line L at an end of the first surface 11 along a reverse direction.

In this application, the first part 411 is entirely attached to the first surface 11. During attaching of the adhesive tape 5 onto the first part 411, the first part 411 may not be deformed, thereby ensuring the connection strength between the first insulating sheet 41 and the electrode assembly 1. In addition, during assembly of the electrode assembly 1 and the housing 2, damage to the first insulating sheet 41 can be reduced to some extent according to this application, improving the safety performance of the secondary battery.

Specifically, the adhesive tape 5 is disposed on the outsides of the first part 411 and the electrode assembly 1, and respectively attached to the first part 411 and the second surfaces 12.

Figure 3:
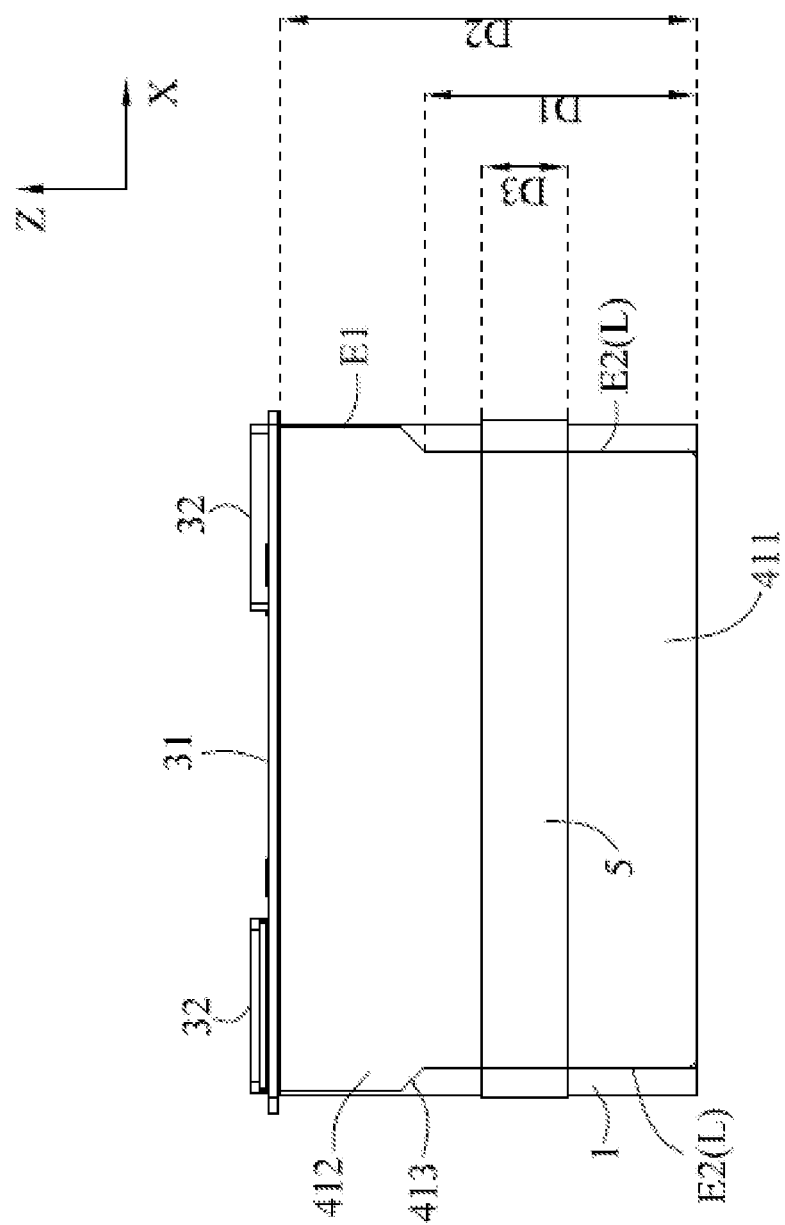
FIG. 3 is a front view of the secondary battery of FIG. 2.

Referring to FIG. 3, the first insulating sheet 41 further includes a second part 412, and the second part 412 is disposed at a side of the first part 411 close to the top cover assembly 3. Along a width direction X, an edge E1 of the second part 412 goes beyond an edge E2 of the first part 411. In the width direction X, a dimension of the second part 412 is greater than a dimension of the first part 411. It is added here that, based on the center of the first insulating sheet 41 along the width direction X, in the width direction X, the edge E1 of the second part 412 in a forward direction goes beyond the edge E2 of the first part 411 along a forward direction, and the edge E1 of the second part 412 along a reverse direction goes beyond the edge E2 of the first part 411 along a reverse direction.

A connection strap 33 is disposed between a top cover plate 31 and an electrode assembly 1, and the second part 412 can separate the connection strap 33 from the housing 2 to prevent a short circuit. If the dimension of the second part 412 is too small, the connection strap 33 may be exposed, leading to a safety risk. Therefore, the dimension of the second part 412 is preferably increased in this application to make the dimension of the second part 412 greater than that of the first part 411.

Along the width direction X, the edge E1 of the second part 412 goes beyond an intersecting line L. It is added here that, based on the center of the second part 412 along the width direction X, in the width direction X, the edge E1 of the second part 412 along a forward direction goes beyond the intersecting line L at an end of a first surface 11 along a forward direction, and the edge E1 of the second part 412 along a reverse direction goes beyond the intersecting line L at an end of the first surface 11 along a reverse direction. The electrode assembly 1 expands during operation, and a region of a second surface 12 close to the intersecting line L may also be pressed by the housing 2. To further reduce the safety risk, both of the two edges E1 of the second part 412 along the width direction X go beyond the intersecting line L.

In this application, a first side wall 21 is disposed opposite to the first surface 11, and a second side wall 22 is disposed opposite to the second surface 12. Because the second surface 12 includes a plurality of arc surfaces 131, there is a large gap between the second surface 12 and the second side wall 22, and the second surface 12 bears no pressure from the second side wall 22.

In the width direction X, at least a portion of the second surface 12 is closer to the second side wall 22 than the second part 412. In this case, in the width direction X, an overall dimension of the second part 412 is less than a dimension of the electrode assembly 1; in the process of placing the electrode assembly 1 into the housing 2, the edge E1 of the second part 412 does not intervene with the housing 2.

The first insulating sheet 41 further includes a third part 413 disposed between the first part 411 and the second part 412. Along the direction close to the first part 411, a dimension of the third part 413 is progressively reduced along the width direction X. Disposing the third part 413 can reduce stress concentration between the first part 411 and the second part 412, and prevent the first insulating sheet 41 from tearing.

The first insulating sheet 41 is fastened to the electrode assembly 1 through the first part 411. If the dimension of the first part 411 is too small, there is no enough space reserved for the adhesive tape 5, leading to a low connection strength between the first insulating sheet 41 and the electrode assembly 1, and the first insulating sheet 41 is easily detachable from the electrode assembly 1. If the dimension of the first part 411 is too large, the dimension of the second part 412 is small. In this case, in a height direction Z, it is difficult for the second part 412 to cover a region between the top cover plate 31 and the electrode assembly 1, and a member (such as the connection strap 33) between the top cover plate 31 and the electrode assembly 1 is easily exposed, leading to a safety risk. Therefore, preferably along the height direction Z, a ratio of the dimension D1 of the first part 411 to the dimension D2 of the first insulating sheet 41 is 0.2 to 0.8.

Along the height direction Z, a ratio of a dimension D3 of the adhesive tape 5 to the dimension D1 of the first part 411 is 0.2 to 0.9. A larger dimension of the adhesive tape 5 indicates a higher connection strength between the first insulating sheet 41 and the electrode assembly 1. Therefore, preferably, the ratio of the dimension D3 of the adhesive tape 5 to the dimension D1 of the first part 411 is not less than 0.2. If the dimension of the adhesive tape 5 is too large, during winding of the adhesive tape 5, the adhesive tape 5 is easily wound onto the third part 413 because of error, leading to warping of the first insulating sheet 41. In addition, if the dimension of the adhesive tape 5 is too large, the adhesive tape 5 also badly hampers inflation of a local area of the electrode assembly 1, leading to a risk of precipitation of lithium. Therefore, the ratio of the dimension D3 of the adhesive tape 5 to the dimension D1 of the first part 411 is not greater than 0.9.

Figure 8:
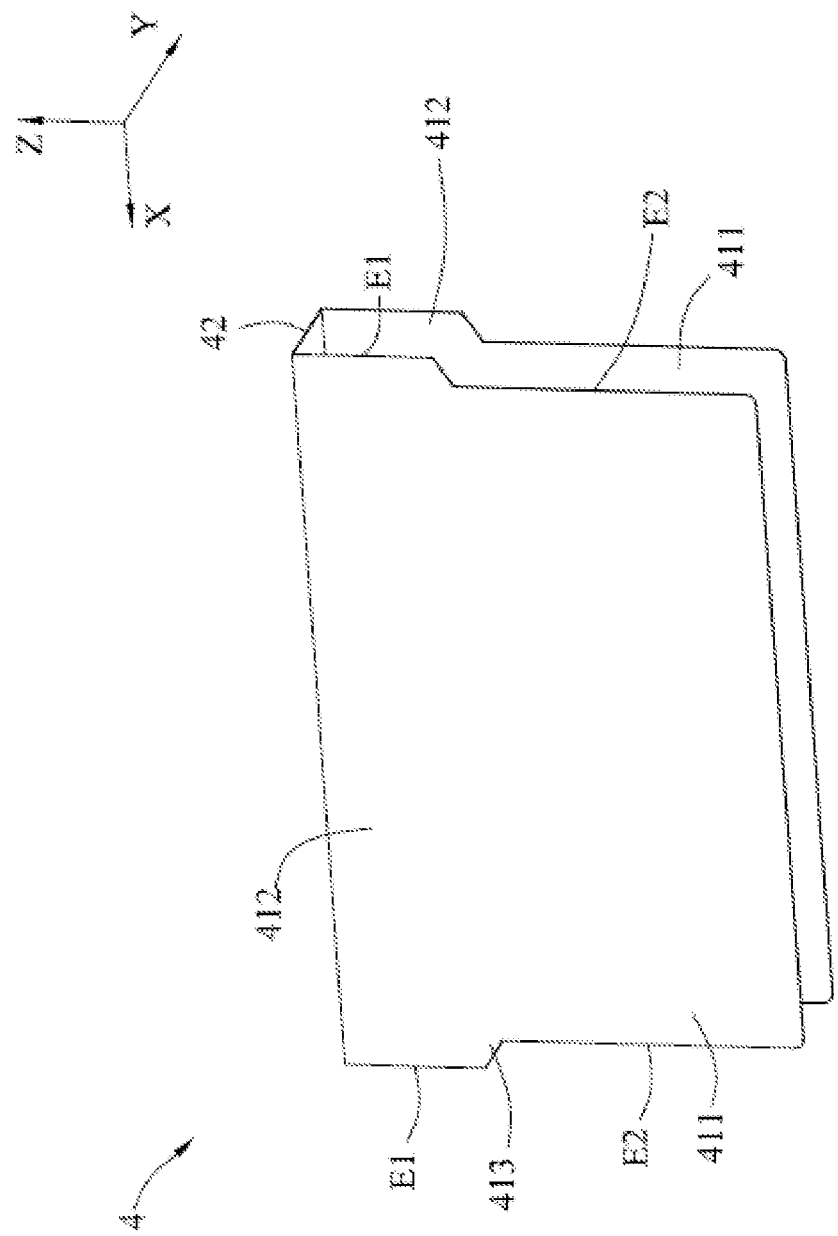
FIG. 8 is a schematic diagram of an insulating member of a secondary battery according to the present invention.
Figure 9:
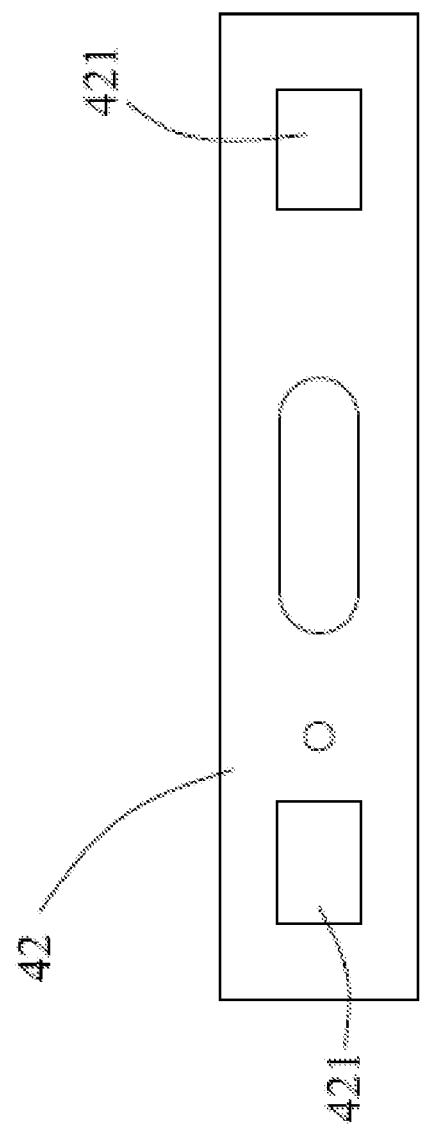
FIG. 9 is a vertical view of the insulating member of FIG. 8.

Referring to FIG. 4, FIG. 8, and FIG. 9, an insulating member 4 further includes a second insulating sheet 42. The second insulating sheet 42 is fastened to a side of a top cover plate 31 close to an electrode assembly 1. In this case, the second insulating sheet 42 insulates an inner surface of the top cover plate 31 close to the electrode assembly 1, preventing the top cover plate 31 from coming in contact with members such as the electrode assembly 1 and a connection strap 33. The second insulating sheet 42 may be sandwiched between the connection strap 33 and the top cover plate 31. The second insulating sheet 42 has through holes 421, and the electrode terminals 32 pass through the through holes 421 and are welded to the connection strap 33.

Two ends of the second insulating sheet 42 are connected respectively to first insulating sheets 41. The two first insulating sheets 41 and the second insulating sheet 42 form a U-shape structure. The insulating member 4 of this application is integrally formed, and can implement insulation of the top cover plate 31 while protecting the electrode assembly 1, effectively simplifying an internal structure of a secondary battery.

Alternatively, the electrode assembly 1 of this application may alternatively include only one electrode unit 13. In this case, first surfaces 11 of the electrode assembly 1 are main surfaces 132 of the electrode unit 13, and second surfaces 12 of the electrode assembly 1 are arc surfaces 131 of the electrode unit 13.

What is claimed is:

1. A secondary battery, comprising an electrode assembly, a housing, a top cover assembly and an insulating member; wherein
   the electrode assembly comprises two first surfaces and two second surfaces, and the two first surfaces are located respectively at two ends of the electrode assembly in a thickness direction of the secondary battery;
   the second surfaces are extended from the ends of the first surfaces along a width direction of the secondary battery, and intersecting lines are formed between the first surfaces and the second surfaces;
   the housing has an opening and forms an accommodating cavity, the electrode assembly is located inside the accommodating cavity of the housing, and the top cover assembly is connected to the housing;
   the insulating member comprises two first insulating sheets, and the two first insulating sheets are disposed respectively at two sides of the electrode assembly along the thickness direction; and
   the first insulating sheet comprises a first part, and along the width direction, an edge of the first part does not go beyond the intersecting line.

2. The secondary battery according to claim 1, wherein the first insulating sheet further comprises a second part, and the second part is disposed at a side of the first part close to the top cover assembly; and
   along the width direction, an edge of the second part goes beyond the edge of the first part.

3. The secondary battery according to claim 2, wherein along the width direction, the edge of the second part goes beyond the intersecting line.

4. The secondary battery according to claim 3, wherein
   the housing comprises first side walls and second side walls, the first side walls are disposed opposite to the first surfaces, and the second side walls are disposed opposite to the second surfaces; and
   in the width direction, at least a partial region of the second surface is closer to the second side wall than the second part.

5. The secondary battery according to claim 2, wherein the first insulating sheet further comprises a third part disposed between the first part and the second part, and along a direction close to the first part, the third part is progressively reduced in dimension along the width direction.

6. The secondary battery according to claim 1, wherein along a height direction of the secondary battery, a ratio of a dimension of the first part to a dimension of the first insulating sheet is 0.2 to 0.8.

7. The secondary battery according to claim 1, wherein the secondary battery further comprises an adhesive tape, and the adhesive tape is disposed at the outsides of the first part and the electrode assembly, and attached to the first part and the second surfaces.

8. The secondary battery according to claim 7, wherein along the height direction, a ratio of a dimension of the adhesive tape to the dimension of the first part is 0.2 to 0.9.

9. The secondary battery according to claim 1, wherein
the electrode assembly comprises a plurality of electrode units arranged along the thickness direction, and each of the electrode units is a winding structure in a flat shape; and
an end of each of the electrode units has an arc surface along the width direction, and the second surface comprises the arc surfaces of the plurality of electrode units.

10. The secondary battery according to claim 1, wherein
the top cover assembly comprises a top cover plate, and the top cover plate is connected to the housing;
the insulating member further comprises a second insulating sheet, and the second insulating sheet is fastened to a side of the top cover plate close to the electrode assembly; and
the second insulating sheet is connected to the first insulating sheet.

11. The secondary battery according to claim 10, wherein
the top cover assembly further comprises electrode terminals and a connection strap, the electrode terminals are disposed on the top cover plate, and the connection strap is connected to the electrode terminals and the electrode assembly;
at least a part of the second insulating sheet is sandwiched between the connection strap and the top cover plate.

12. The secondary battery according to claim 11, wherein the second insulating sheet has through holes, and the electrode terminals pass through the through holes.

13. The secondary battery according to claim 10, wherein the two first insulating sheets and the second insulating sheet form a U-shape structure and are integrally formed.

14. The secondary battery according to claim 1, wherein the first surfaces are planes.

* * * * *